UNITED STATES PATENT OFFICE.

SIMEON BISHOP, OF SAN FRANCISCO, CALIFORNIA.

METHOD OF PRESERVING FOODS.

SPECIFICATION forming part of Letters Patent No. 683,899, dated October 8, 1901.

Application filed October 29, 1900. Serial No. 34,848. (No specimens.)

*To all whom it may concern:*

Be it known that I, SIMEON BISHOP, a citizen of the United States, residing at San Francisco, in the county of San Francisco and State of California, have invented certain new and useful Improvements in Methods of Preserving Foods; and I do hereby declare the following to be a full, clear, and exact description of the invention, such as will enable others skilled in the art to which it appertains to make and use the same.

This invention aims to prolong the period of usefulness of fruit, vegetables, eggs, and the like as articles of food and prevent their usual rapid decay and deterioration, thereby benefitting the grower, the shipper, the merchant, and the consumer.

The invention consists in subjecting the article of food to an antiseptic bath to purify, cleanse, and kill all germ, then treating it to a coat of air-excluding material. This process not only preserves the article of food, but enhances its value.

The article of food to be treated is first washed or bathed in a comparatively weak solution of boracic acid, which destroys any and all germs and thoroughly cleanses and renders the article wholesome. The article is then coated with gelatin, which excludes the air and prevents the entrance of atmospheric germs, thereby preventing decay. After drying the articles may be packed for shipment, storage, or other purpose, or they may be wrapped in tissue-paper rendered antiseptic by being immersed in a solution of boracic acid and then packed or stored.

The application of boracic acid is advantageous in that it prevents decay and adds to the appearance of the article and is perfectly harmless to the human system. The gelatin, besides excluding the air, also adds to the appearance of the article.

The boracic-acid solution is prepared by adding two ounces of commercial boracic acid to one gallon of pure filtered water. The gelatin is treated by dissolving one pound in a pint of pure water heated to maintain the mixture in a fluid condition.

Having thus described the invention, what is claimed as new is—

1. The method of treating articles of food to preserve and enhance their value, which consists in washing them with a solution of boracic acid and then applying a coating of gelatin, substantially as described.

2. The method of treating articles of food to preserve and enhance their value, which consists in washing them with a solution of boracic acid and then applying a coating of gelatin, and finally wrapping the article in tissue paper which has been impregnated with a solution of boracic acid, substantially as specified.

In testimony whereof I affix my signature in presence of two witnesses.

SIMEON BISHOP. [L. S.]

Witnesses:
EDWIN W. WOODWARD,
LEO K. KENNEDY.